(No Model.)

A. C. CHENOWETH.
LAYING CONTINUOUS ELECTRICAL CONDUITS.

No. 366,457. Patented July 12, 1887.

WITNESSES:
C. Neveux
C. Sedgwick

INVENTOR:
A. C. Chenoweth
BY Munn & Co.
ATTORNEYS.

UNITED STATES PATENT OFFICE.

ALEXANDER CRAWFORD CHENOWETH, OF NEW YORK, N. Y.

LAYING CONTINUOUS ELECTRICAL CONDUITS.

SPECIFICATION forming part of Letters Patent No. 366,457, dated July 12, 1887.

Application filed November 16, 1886. Serial No. 219,107. (No model.)

*To all whom it may concern:*

Be it known that I, ALEXANDER CRAWFORD CHENOWETH, a citizen of the United States, residing in New York city, county and State of New York, have invented certain new and useful Improvements in Laying Continuous Conduits for Electrical Wires or other Purposes, of which the following is a specification.

My invention consists of a method of laying and forming conduits, as hereinafter described and claimed.

Reference is to be had to the accompanying drawings, forming a part of this specification, in which similar letters of reference indicate corresponding parts in all the figures.

Figure 1:
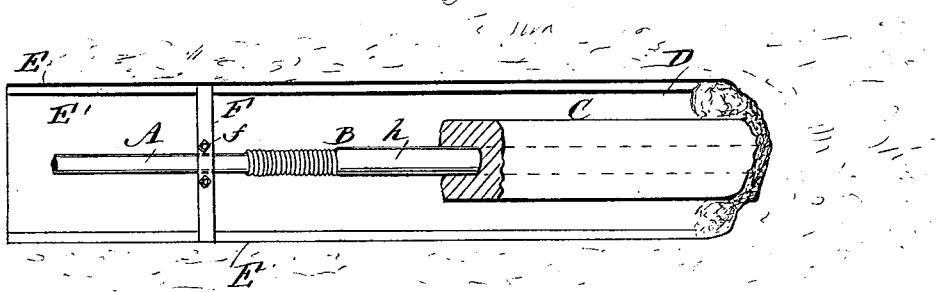
Figure 2:
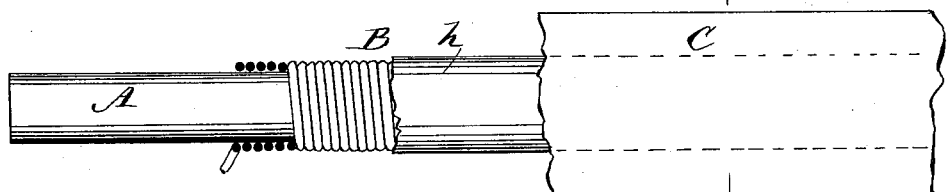
Figure 3:
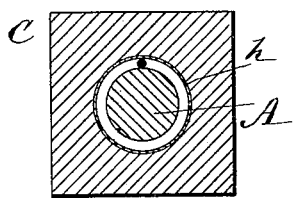
Figure 4:
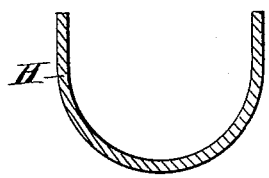
Figure 5:
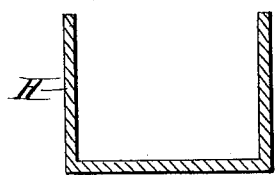

Figure 1 is a plan view showing a portion of a trench, conduit-core, and removable casing for the core. Fig. 2 is a plan view of the same without the trench, and Fig. 3 is a transverse section showing a circular conduit. Figs. 4 and 5 show the forms of conduit-molds.

In forming the conduit I use a core, A, preferably of wood, preferably round in cross-section, and of any suitable length. This core I inclose in a casing, B, preferably of rope or wire wrapped spirally around the core, so that it may be withdrawn easily from the casing. The conduit C, preferably of asphaltum or other concrete, is built around the casing and left a sufficient length of time to set. Then the core A is withdrawn from the casing B, and, finally, the casing is withdrawn, which can be easily done by grasping the outer end of the coil and drawing outward upon it, thus leaving the conduit complete, with an unobstructed passage through it for the insertion of electric wires and cables. In this manner sections of conduit may be formed, to be subsequently laid in the ground, end to end, to form a continuous subway-conduit; but I prefer to form or mold the conduit in the ground, in which case I dig a trench, D, in the ground and incase it with a casing, E, of wood or other material, or form only a bottom, E', of cement, asphaltum, wood, or other suitable material, in the trench. The core A and casing B are then suspended in the trench by a suitable frame, F, provided with a bail, *f*, which holds the core and casing a short distance above the bottom of the trench. I then pour the plastic material to form the conduit about the core and casing and tamp it well under and all around the casing. After the conduit material is set sufficiently I withdraw the core and subsequently the casing, and then proceed as before to form another section, joining it on the end of the last section, thus forming a continuous conduit.

In order to facilitate the withdrawal of the casing B after it is placed upon the core, I smear it upon the outside with a thin layer, *h*, of plaster or other material, so that the plastic material composing the conduit will not settle into or between the coils. If wire is used for the casing, this need not be done.

In building the conduit around the core and casing it is found convenient, to expedite the work, to use a mold-box, H, U shaped or three-sided, as shown in Figs. 4 and 5, in which the core and casing are placed, so that the conduit material may be poured into the model-box and tamped around the casing.

Having thus fully described my invention, what I claim as new, and desire to secure by Letters Patent, is—

1. The method herein described of forming electric conduits of plastic material, which consists in building the conduit material around a core, and a casing placed upon and surrounding the core, and then withdrawing the core from the casing, and subsequently withdrawing the casing, substantially as set forth.

2. The method herein described of forming subway-conduits, which consists in wrapping a core spirally with a casing, suspending the same in the trench, pouring and forming the conduit material around the casing, then withdrawing the core, and finally the casing, substantially as described.

3. The method herein described of forming electric conduits, which consists in wrapping a core spirally with a casing, covering the casing, then building the conduit material about the casing, and then withdrawing the core and then casing, substantially as described.

ALEXANDER CRAWFORD CHENOWETH.

Witnesses:
 HENRY N. HAMILTON,
 EDWARD F. PLAYLE.